Feb. 7, 1961 F. KEEVE 2,970,886
METHOD AND ABSORBENT FOR REMOVING HYDROCARBON
FROM AUTOMOBILE EXHAUST FUMES
Filed Feb. 10, 1958
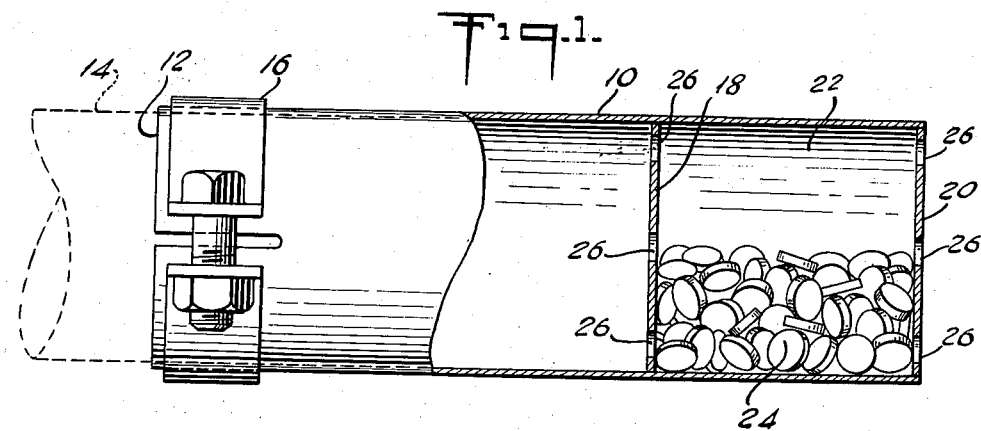
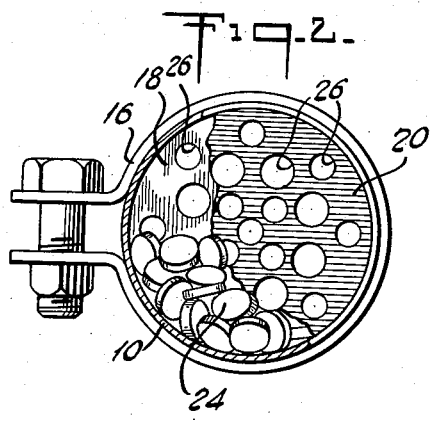
INVENTOR
FRANK KEEVE
BY Herbert J. Evers
ATTORNEY United States Patent Office 2,970,886
Patented Feb. 7, 1961

2,970,886
METHOD AND ABSORBENT FOR REMOVING HYDROCARBON FROM AUTOMOBILE EXHAUST FUMES

Frank Keeve, 372 19th Ave., San Francisco 21, Calif.
Filed Feb. 10, 1958, Ser. No. 714,084
3 Claims. (Cl. 23—2)

This invention relates to an improved means for rapidly and efficiently reducing the hydrocarbon content in automobile exhaust fumes.

Unconsumed hydrocarbons are undesirable compounds which are always present in the atmosphere. The unconsumed hydrocarbons are derived from the exhaust fumes of automobile engines, or the automobile lubricating oil, or it may enter the air from other sources. In recent years it has been found that hydrocarbons are partly responsible for an air pollution phenomenon commonly referred to as smog. This air pollution problem has been aggravated due to the tremendous increase in the production of automobiles and consequently the increased generation of combustion gases. The direct cost of smog, from illness, cororsion, deterioration of paint, soiling of clothing, and above all agricultural crops, runs into millions of dollars. Thus the necessity for a practical and economical method of reducing the contamination in the air is presented.

It is therefore an important object of the present invention to provide a novel composition of matter for the removal of hydrocarbons in automobile exhaust fumes.

Another object of the present invention is to provide an improved apparatus adapted to be fitted on the exhaust pipe of an automobile for reducing the hydrocarbon content normally found in automobile exhaust fumes.

Yet another object of the invention is to provide an improved process for the continuous removal of hydrocarbons in automobile fumes.

Other objects, features and advantages of the invention will be apparent from the following detailed description of a preferred embodiment thereof taken in conjunction with the acompanying drawing in which:

Fig. 1 is an elevational view of an automobile filter embodying the principles of the invention, and Fig. 2 is a sectional view taken along line 2—2 in Fig. 1.

In accordance with the present invention, there is provided a process for removing organic compounds, particularly unconsumed hydrocarbons, in automobile exhaust fumes, by treatment with a novel composition of matter. The process of the invention involves passing the exhaust fumes through a tube where the exhaust fumes are brought into intimate contact with the composition of the invention and the hydrocarbon constituents removed.

The hydrocarbon removing material of the invention comprises a mixture of molybdenum pentoxide, ammonium sulfate, calcium chloride, citric acid, potassium chloride, phenyl salicylate and sodium nitrate having the following weight percent composition range.

|  | Broad Range, percent | Preferred Range, percent |
|---|---|---|
| 1. Molybdenum Pentoxide | 48 to 55 | 48 to 52 |
| 2. Ammonium sulfate | 10 to 17 | 10 to 15 |
| 3. Calcium chloride | 8 to 12 | 8 to 9 |
| 4. Citric acid | 20 to 30 | 20 to 25 |
| 5. Potassium chloride | 4 to 12 | 4 to 10 |
| 6. Phenyl salicylate | 7 to 14 | 7 to 9 |
| 7. Sodium nitrate | 3 to 7 | 3 to 6 |

The hydrocarbon treating material of the invention is preferably employed in pellet form ranging in particle sizes between ¼" and ⅜" although larger or smaller pellet sizes may be used if so desired.

The efficiency of the invention is illustrated by the startling contrast between the hydrocarbon content in untreated automobile fumes and gases treated with the chemical composition of the invention. Exhaust gases treated in accordance with the invention have been found to have approximately 89% less hydrocarbons. In addition, the hydrocarbon removing properties of the pellet material of the invention have been found to be exceptionally long-lasting, the life expectancy being about one year.

Referring now to the drawing, there is shown in Figs. 1 and 2 a hydrocarbon removing apparatus comprising an elongated cylindrical tube 10 made of stainless steel or other non-corrodible metal and having an opening 12 at one end thereof adapted to be clampingly fitted onto the exhaust pipe 14 of an automobile as by means of clamp 16. The tube 10 is provided with circular baffle plates 18, 20 which are spacedly arranged to form a pellet chamber 22 for holding pellets 24 constituting the chemical composition of the invention. The plates 18, 20 are suitably apertured with a staggered arrangement of variously sized openings 26, thereby to control the passage of exhaust gases through the pellet chamber 22 so that intimate contact between the hydrocarbons and the pellets 24 may be effected. The treated exhaust gas will then pass through the end baffle 20 where it will be released into the atmosphere.

It will be understood that modifications and variations may be effected without departing from the spirit and scope of the invention.

What is claimed is:

1. An agent for the removal of hydrocarbons from exhaust gases consisting essentially of a mixture of 48% to 55% molybdenum pentoxide, 10% to 17% ammonium sulfate, 8% to 12% calcium chloride, 20% to 30% citric acid, 4% to 12% potassium chloride, 7% to 14% phenyl salicylate, and 3% to 7% sodium nitrate.

2. An agent for the removal of hydrocarbons from exhaust gases consisting essentially of a mixture of 48% to 52% molybdenum pentoxide, 10% to 15% ammonium sulfate, 8% to 9% calcium chloride, 20% to 25% citric acid, 4% to 10% potassium chloride, 7% to 9% phenyl salicylate, and 3% to 6% sodium nitrate.

3. A method of continuously reducing the hydrocarbon content in exhaust fumes comprising passing the fumes through an enclosed chamber containing a layer of pelletized material consisting of 48 to 55% molybdenum pentoxide, 10% to 17% ammonium sulfate, 8% to 12% calcium chloride, 20% to 30% citric acid, 4% to 12% potasium chloride, 7% to 14% phenyl salicylate, and 3% to 7% sodium nitrate, and providing baffle plates for ensuring a maximum of intimate contact between said fumes and said pelletized material.

References Cited in the file of this patent

UNITED STATES PATENTS

| 1,716,479 | Bilsky | June 11, 1929 |
| 2,288,943 | Eastman | July 7, 1942 |

FOREIGN PATENTS

| 413,744 | Great Britain | July 26, 1934 |